Aug. 8, 1967 W. D. COCKRELL 3,334,795

SELECTOR SWITCH FOR REGISTER CONTROL

Filed July 15, 1965

4 Sheets-Sheet 1

INVENTOR

WILLIAM D. COCKRELL

BY W. J. Shanley, Jr.

ATTORNEY

INVENTOR
WILLIAM D. COCKRELL

BY W. J. Shanley, Jr.
ATTORNEY

Aug. 8, 1967 W. D. COCKRELL 3,334,795
SELECTOR SWITCH FOR REGISTER CONTROL
Filed July 15, 1965
4 Sheets-Sheet 3
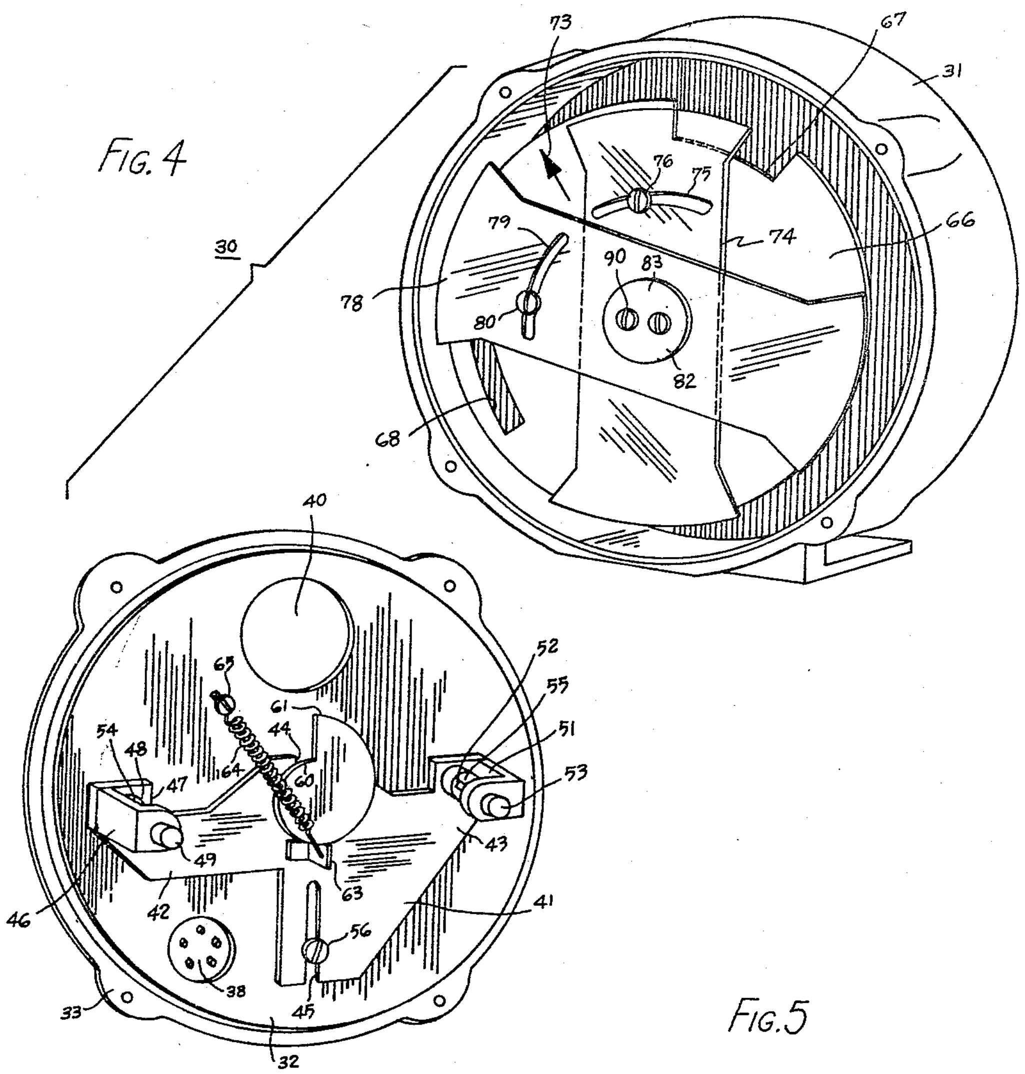
FIG. 4, FIG. 5
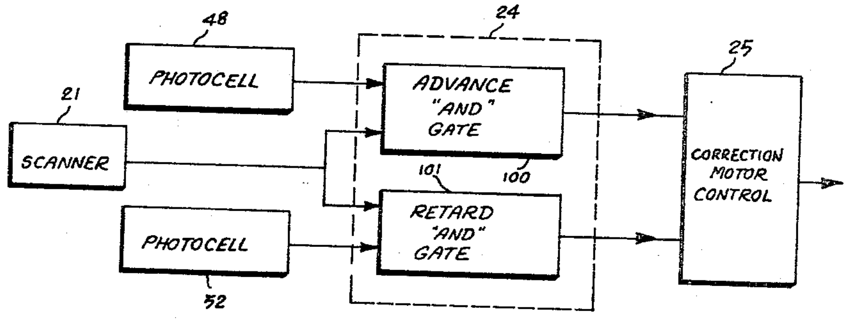
INVENTOR
WILLIAM D. COCKRELL
BY W. J. Shanley Jr.
ATTORNEY INVENTOR.
WILLIAM D. COCKRELL
BY W. J. Shanley Jr.
ATTORNEY

United States Patent Office 3,334,795

Patented Aug. 8, 1967

3,334,795

SELECTOR SWITCH FOR REGISTER CONTROL

William D. Cockrell, Waynesboro, Va., assignor to General Electric Company, a corporation of New York Filed July 15, 1965, Ser. No. 472,209

14 Claims. (Cl. 226—31)

This invention relates to a system for advancing web material of indeterminate length to a repetitive operating or work performing means. More particularly, this invention is directed to a means to sense the position of the operating means with respect to registration marks on the advancing web material.

Register control is usually applied to cutting or printing systems to synchronize their operations with a predetermined pattern on the web material. Although theoretically a system without inherent error is possible, such a system is not practically possible because various factors, such as the change in web tension as the web material is removed, lost motion in mechanical linkage, and stretch in the web material, inherently introduce some error in the system. As the printing or cutting operation normally occurs with relation to a preprinted pattern, the web material position with respect to the operating means is critical. Therefore, some means must be provided to correct either the web material feed rate or the operating means rate to compensate for such inherent errors. Preferably, such a correction is made automatically without stopping the system.

Many correcting means have been shown in the prior art. Some utilize a magnetic signal and a scanner signal to show proper operation. Other means sense a registration mark on the material and a mark on the operating means to provide a signal indicative of misregistration. Still other means use electromechanical devices, such as cams or switches, to indicate web position and operating means position. However, each of these indicating means, commonly known as selector switches, may, in particular applications, include disadvantageous features. For instance, a selector switch comprising switches or cams usually requires some linkage which introduces error as a result of lost motion in the linkage. Such electromechanical selector switches also are subject to frictional wear and, during sustained operation, they also introduce error. Still other selector switches, including both electromechanical and photoelectric, have been devised which are not readily adaptable to adjustment during operation of the system. Other selector switches have utilized adjustment means which do not provide a symmetrical change.

An object of this invention is to provide an energy-sensitive selector switch which can be substituted for prior art devices.

Another object of this invention is to provide a selector switch which is not subject to substantial wear and hence incorporates more sustained accuracy and more reliability than prior art electromechanical selector switches.

Another object of this invention is to provide a selector switch which is easily adjusted and can be adjusted symmetrically.

A further object is to provide a register control for a traveling web-repetitive work performing system wherein position control of the web is initiated whenever a point-of-work-performed signal coacts with either two work-tolerance signals generated symmetrically about the work-performed signal.

Briefly stated, this invention comprises a selector switch which emits a first signal immediately prior to the cutting or printing operation and a second signal immediately thereafter as a direct function of the position of the knife, printer or other work performing means. These signals are representative of "live zones" separated by a "dead zone" which coincides in time with the operation of the work performing means. When a signal produced by a scanning means, which sense registration marks on the advancing material, coincides with one of the "live zone" signals, an error is indicated at a control panel which controls circuit means to initiate operation of a web material feed correction means. A rotatable disc mounted for rotation with the work performing means and having two openings therein produces a "live zone" signal when one opening passes one of a pair of energy-producing means thereby energizing an energy-sensitive device associated therewith.

The novel features which are characteristic of this invention are set forth with particularly in the appended claims. The invention itself, however, as to its organization, together with further objects and advantages, may be understood by references to the following description of a selector switch used in a register control system taken in conjunction with the accompanying drawings and description.

Figure 2:
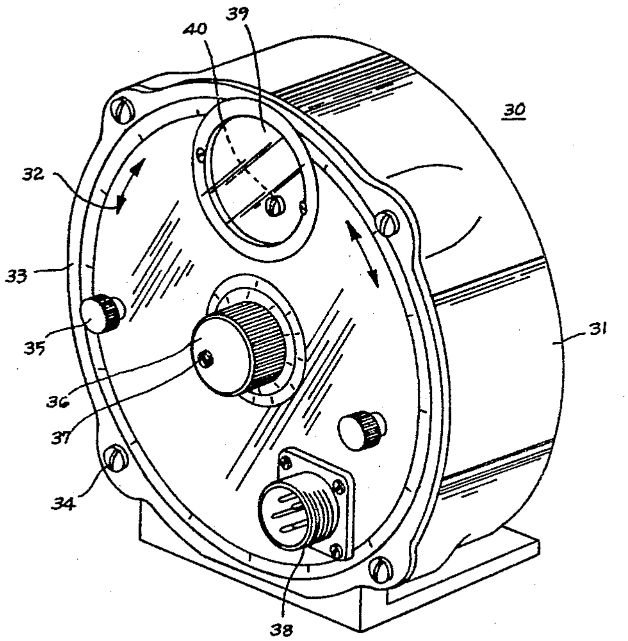
FIGURE 2 illustrates a perspective view of an assembled selector switch as forms this invention.

FIGURE 4 preesnts another view of the selector switch shown in FIGURE 2 with the various elements mounted.

FIGURE 5 illustrates a schematic block diagram of a circuit which can be associated with the selector switch.

Figures 6, 7, 8:
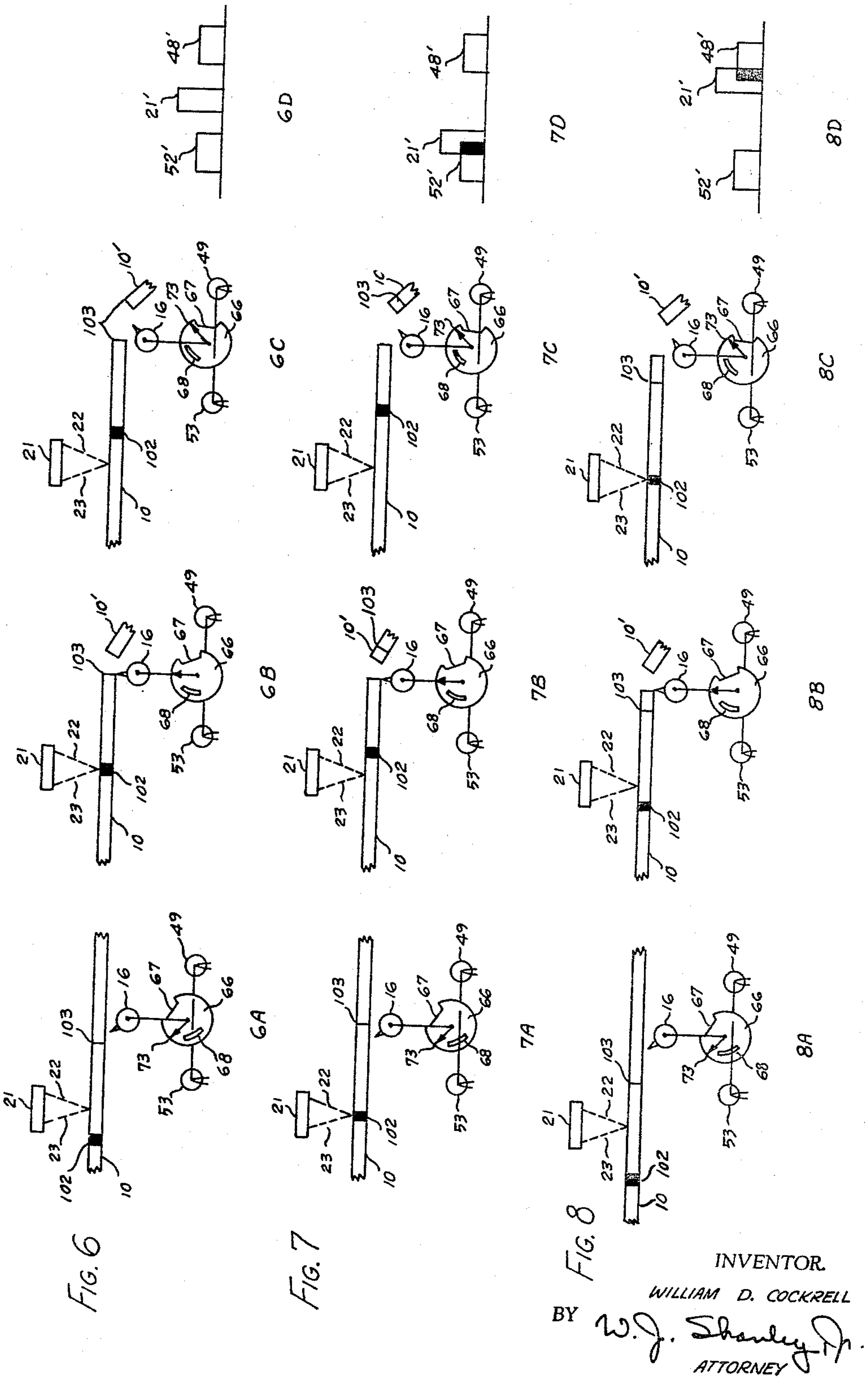

FIGURE 6 illustrates the operation of the selector switch when the system is operating in register.

FIGURE 7 illustrates the operation of the selector switch when the system operates improperly by feeding the material too quickly.

FIGURE 8 illustrates the operation of the selector switch when the system operates improperly by feeding the material too slowly.

Figure 1:
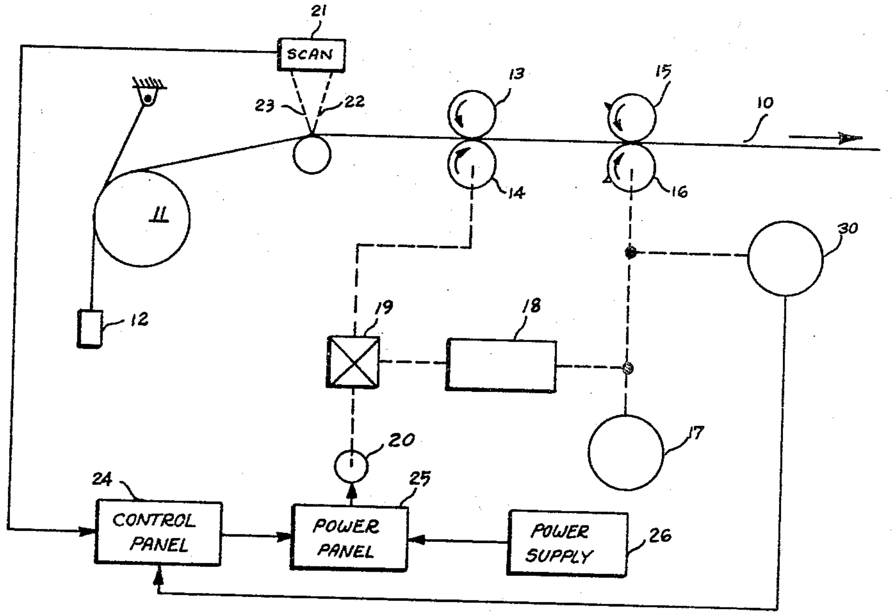
FIGURE 1 illustrates a line diagram of a register control system which uses an improved selector switch in accordance with this invention.

Referring to FIGURE 1, an indeterminate length of web material 10 is drawn from a storage roll 11 under tension applied by a tension brake 12 or other tension regulating means. After the web material 10 is drawn from the storage roll 11 by a first feed roller 13 and a second feed roller 14 which coact, it passes between a work performing means which is used to cut or print the web material 10.

In the particular embodiment shown in FIGURE 1, the operating means comprises a first rotary cutter 15 and a second rotary cutter 16 which cut the web material 10 at a predetermined position on a preprinted pattern as the material is moving. As the position of such a cutting operation is critical, means to locate the web material 10 must be provided to regulate the movement of the web material 10 in response to the rotary cutters 15 and 16. A main drive motor 17 is provided to drive the rotary cutters 15 and 16 directly while also driving the feed rollers 13 and 14 by means of an adjustable drive train. In the specific system shown in FIGURE 1, the adjustable drive train comprises a constant velocity gear system 18 and a differential gear system 19. Two inputs for the differential gear system 19 are constituted by an output from the constant velocity gear system 18 and an output from a correction motor 20. The output from the correction motor 20 causes variation in the output of the differential gear system which also causes the feed rollers 13 and 14 to vary the web material feed rate. A scanning device 21, comprising an energy-sensitive device and an energy-emitting device, produces a signal in response to the passage of a registration mark on the web material 10 when an incident light beam 22, which normally causes a reflected light beam 23 to impinge on the energy-sensitive device, is interrupted by the registration mark on the web material. The signal thus emitted from the scanning device 21 is coupled to a control panel 24. The output of the control panel 24, which is indicative of the relative positions of the web material 10 and the rotary cutters 15 and 16 as the rotary cutters 15 and 16 are cutting, is coupled to a power panel 25 energized by a power supply 26.

A signal which is indicative of the position of the rotary cutters 15 and 16 is provided by a selector switch 30 shown in FIGURE 2 as an assembled device including exterior controls. The selector switch 30 generally comprises a housing 31 and a cover plate 32 secured tightly against the housing 31 by a locking ring 33 and a plurality of thumb nuts 34. When the thumb nuts 34 are loosened, the cover plate 32 can be rotated with respect to the housing 31 by means of a pair of knobs 35 which are affixed to the cover plate. "Dead zone" variation is provided from the exterior of the selector switch 30 by means of a "dead zone" vernier knob 36 which is locked in position by a locking means shown as a "dead zone" vernier knob lock 37. Power for the selector switch and an output for the elements within the selector switch are provided through an interconnecting cable, not shown, which can be connected to a male terminal member 38 which is also affixed to the cover member 32. Visual access to interior portions of the selector switch 30 is provided by a removable transparent disc 39 affixed to the cover plate 32 to normally block physical entry to a cover plate aperture 40.

Figure 3:
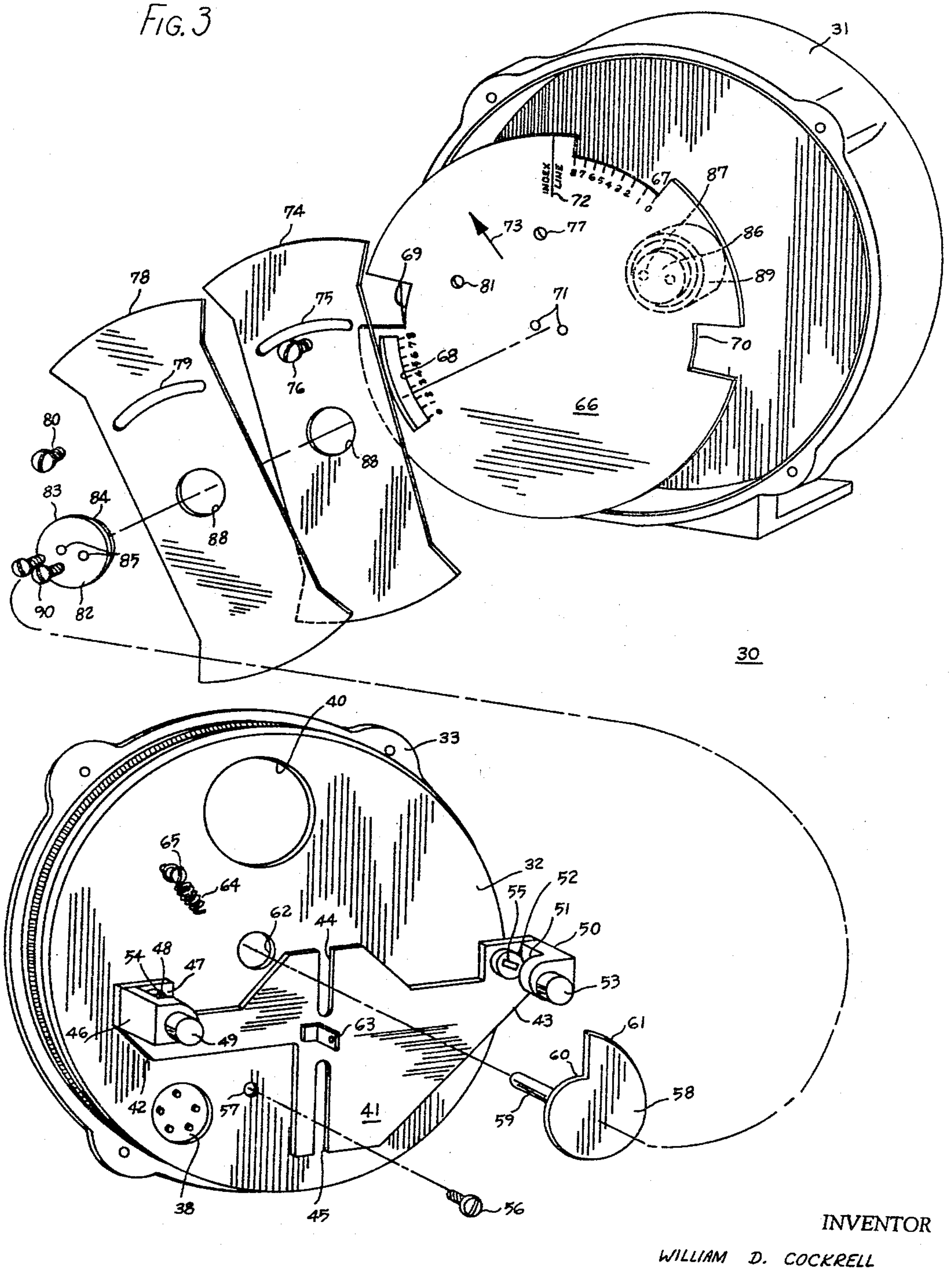
FIGURE 3 illustrates an exploded view of the elements of the selector switch shown in FIGURE 2.

Referring to FIGURES 3 and 4, the cover plate 32 has a plurality of elements mounted thereon. A bracket 41 comprising a first arm 42, a second arm 43, a first slot 44 and a second slot 45 serves as a movable support for the control elements. A first L-shaped bracket 46 is mounted on the first arm 42 so as to form a first recess 47 between the first L-shaped bracket 46 and the first arm 42. A first energy-sensitive device, such as a photocell 48, and a first energy-emitting device, such as photolamp 49, are mounted on opposite sides of the first recess 47. A second L-shaped bracket 50 forms a second recess 51 in a similar manner so that a second photocell 52 and a second photolamp 53 can be mounted on the second arm 43. First and second aperture masks 54 and 55 are disposed in front of the first and second photocells 48 and 52 respectively. An aperture through each of the masks in the form of a narrow slit defines the accuracy of the system. For maximum accuracy neither slit is horizontal; rather, each slit is at an angle as discussed hereinafter. The bracket 41 is slideably affixed to the cover plate 32 by a securing means such as a bolt 56 which passes through the second slot 45 to engage a tapped aperture 57 and by a cam 58 having a shaft 59. The cam 58 has a minimum radius at 60 and a maximum radius at 61. Its shaft 59 passes through the first slot 44 of the bracket 41 and a central aperture 62 formed in the cover plate 32 to be engaged by dead zone vernier knob 36. As shown in FIGURES 3 and 4, the bracket 41 is freely slideable in a vertical, longitudinal direction with respect to the cover plate 32. A tab 63 formed on the bracket 41 or affixed thereto serves as a cam follower for the cam 58 and as one of a pair of spring holders. The bracket 41 is biased against the cam 58 by a spring 64, or other biasing means, which extends between the tab 63 and another spring holder 65.

The position of the work performing means is indicated by a disc 66 which is mounted in the housing 31. The disc 66 has a first annular slot 67 and a second annular slot 68 formed therein. As shown in the figures, the first annular slot 67 is formed at a first radius while the second annular slot 68 is formed at a second radius from the center of the disc 66. These slots 67 and 68 are angularly spaced at least 90 degrees apart. In addition, the radially extending edges of each slot are substantially parallel to the angle of the slits in the aperture masks 54 and 55 when either the leading or trailing edge of one of the annular slots 67 or 68 approaches its respective mask 54 or 55. With such a parallel relationship the light change on the photocell is substantially a set function.

A first cutout 69 and a second cutout 70 are formed in the disc 66 and are diametrically opposed. Also formed in the disc 66 are a pair of mounting holes 71, and index line 72 which is angularly disposed between the cutouts 69 and 70, and a registration line 73 which is angularly disposed midway between the first and second annular slots 67 and 68.

The first annular slot 67 can be partially covered by a first shutter 74 having a slot 75 formed therein through which a bolt 76 passes to engage a tapped aperture 77 in the disc 66. A second shutter 78 serves to determine the size of the second annular slot 68 while blocking the first and second cutouts 69 and 70. This shutter 78 has a slot 79 formed therein through which a bolt 80 extends to engage a tapped aperture 81. Both the first shutter 74 and the second shutter 78 are adapted to rotate about a shutter cap 82 having a flange portion 83, a reduced portion 84 and two mounting holes 85. The mounting holes 71 in disc 66 and the mounting holes 85 in the shutter cap 82 are aligned with each other and are used to hold the shutters 74 and 78 and the disc 66 against a shaft 86 having tapped apertures 87 formed in the end thereof. The shaft 86 is adapted to be connected to the rotary cutters 15 and 16.

In assembling these elements in the housing 31 as shown in FIGURE 4, the reduced portion 84 of the shutter cap 82 is inserted through central pivot holes 88 of both the shutters 74 and 78 until an end of the shutter cap reduced portion 84 abuts the disc 66. A pair of clamping bolts 90 are then inserted through the mounting holes 85 and 71 and threaded into the tapped apertures 87. The shaft 86, also adapted to be engaged by a driving member, is coupled to the work performing means so that the shaft 86 constantly and accurately reflects the position of the work performing means. The shaft 86 rotates in the hub 89. With such a connection, the disc 66, with the attached shutters 74 and 78, rotates with the work performing means.

The cover plate 32 and the housing 31 are assembled by rotating shutters 74 and 78 to uncover the cutouts 69 and 70 and the index line 72. The cover is then positioned so that the index line 72 is visible through the transparent disc 39 and centrally located with respect to the cover plate aperture 40. In this position, the L-shaped brackets 46 and 50 are aligned with the cutouts 69 and 70 so that the cover plate 32 can be mounted to the housing 31. When the cover plate 32 is mounted, the disc 66 and the shutters 74 and 78 are free to rotate as the circumferential portions of the disc 66 are disposed in the recesses 47 and 51. The locking ring 33 is placed over the cover plate 32 and affixed to the housing 31 by the thumb nuts 34 so that the cover is freely rotatable with respect to the housing. The selector switch 30 is then electrically connected to the control panel 24 by means of the interconnecting cable which is attached to the male terminal member 38.

Before discussing the adjustment and operation of the selector switch, reference is made to FIGURE 5 wherein a circuit schematic is presented which can be used with a selector switch 30 as forms this invention. The circuit comprises two "and" gates which are normally located in the control panel 24 shown in FIGURE 1. An "advance and" gate 100 is energized by signals from the scanning device 21 and the photocell 48 while a "retard and" gate 101 is energized by signals from the scanning device 21 and the photocell 52. Simultaneous energization of both inputs to the "advance and" gate 100, caused by light striking the photocell 48 and the registration mark on the web material 10 thereby interrupting the reflected light beam 23 to the scanning device 21, provides an "advance output" signal. This output signal is fed to the power panel 25 to cause rotation of correction motor 22 thereby advancing the web material 10. When the reflected light beam 23 to the scanning device 21 is interrupted simultaneously with light striking the photocell 52, both inputs to the "retard and" gate 101 are energized thereby causing a "retard output" signal to be fed to the power panel 25 with a resultant rotation of the correction motor 20 so as to retard the web travel.

Operation of the selector switch 30 in conjunction with a scanning device 21 can thus be understood by reference to FIGURES 6, 7, and 8 which reveal a sequence of operation to show the various signal combinations which can be produced. FIGURE 6 reveals a strip of web material 10 which has a registration mark 102 formed thereon and which is to be cut at a point designated as a cut line 103. Shown diagrammatically are a scanning device 21 with its incident and reflected light beams 22 and 23, one of the coacting rotary cutters 16, the disc 66 and the photolamps 49 and 53. For purposes of clarity the photocells 48 and 52 are not shown. In FIGURE 6*a*, the web material 10 is positioned prior to time at which the rotary cutters cut the web material and immediately prior to the time when the registration mark 102 passes beneath the scanning device 21. The position of the rotary cutter 16 is translated to the disc 66 which is positioned so that light from the photolamp 53 passes through the annular slot 68 to activate the photocell 52 thereby producing a pulse shown in FIGURE 6*d* as pulse 52′. In FIGURE 6*b*, the web material and cutter having advanced to a cutting position, the registration mark 102 appears directly under the scanning device 21 so that the reflected light beam 23 is interrupted. A scanner pulse 21′ is applied to both the "advance and" and the "retard and" gates 104 and 105 shown in FIGURE 5. As both the annular slots 67 and 68 are positioned so that light from the photolamps 49 and 53 cannot pass to their respective photocells, neither "and" gate produces an output signal. Also at this time, FIGURE 6*b* shows, diagrammatically, that a piece of material 10′ has been severed from the main web material 10 at the cut line 103. When the cutter and material have advanced even farther, light from the photolamp 49 passes through the first annular slot 67 to energize the photocell 48 thereby causing a pulse 48′ to be applied to the "advance and" gate 100. Referring to FIGURE 6*d*, it can be clearly seen that neither the "advance and" gate 104 nor the "retard and" gate 105 have emitted an output signal.

FIGURE 7 represents the signal sequence which occurs when the register mark arrives too early. When the cutter 16 is in a position as shown in FIGURE 7*a*, light from the photolamp 53 passes through the annular slot 68 to energize the photocell 52 causing a pulse 52′ to be applied to one input of the "retard and" gate 101. At the same time, however, the registration mark 102 appears under the scanning device 21 so that a scanning device output pulse 21′ is produced concurrently. Simultaneous energization of both inputs of the "retard and" gate 101 causes a "retard output" signal to be applied to the power panel 25 to thereby cause an energization of the correction motor 20 which causes the web to be retarded. FIGURES 7*b* and 7*c* show the remainder of the sequence with the cutter 16 being in the cutting position after the registration mark 102 has passed beyond the scanning device 21 so that when the strip 10 is cut, the cut line 103 falls on the severed portion 10*a*′.

In FIGURE 8, the web register mark is late so that the sequence in FIGURES 8*a* through 8*c* causes the registration mark 102 to pass beneath the scanning device 21 coincidentally in time when light from the photolamp 49 passes through the annular slot 67. This causes the pulse 21′ from the scanning device 21 to be applied to both "and" gates simultaneously with a pulse 48′ being applied to the "advance and" gate 100. When this pulse sequence occurs, as shown in FIGURE 8*d*, the correction motor is energized to advance the material. As shown in FIGURE 8, subsequent to the cutting operation the cut line 103 remains on the web material to be cut with the next piece.

As pointed out in the objects stated above, the selector switch 30 is constructed to be easily adjusted during operation. The only adjustment which cannot occur during system operation is that of changing the time span of the "live zone." The "live zone" time is determined by the lengths of the two slots 67 and 68 which are controlled by the position of the shutters 74 and 78. However, the selector switch 30 is constructed so that the cover 32 does not have to be removed. The transparent disc 39 is merely removed from the cover plate 32, and the cover plate 32 is then rotated until either the bolt 76 or the bolt 80 is accessible. These bolts can be loosened and the shutters rotated. The shutters are used to vary the length of the slot in order to prohibit scanner pulses 21′ caused by other printed matter which appear near the registration mark during the "live zone" from coinciding with either of the "live zone" signals. As the printed material moves closer to the registration mark, the length of the arcuate slots must be decreased. Although this does require machine and system stoppage, it is not serious as this operation is performed only when there is a major change in the design on the web.

The next step in adjustment is to get "dead zone" to coincide with the cutting position of the rotary cutters 15 and 16. With the rotary cutters in their cutting position, the cover plate 32 is rotated while the disc 66 remains stationary until the registration line 73 appears centered in the cover plate aperture 40. At this point both the photocells and photolamps mounted on bracket 41 are equiangularly displaced from the registration line 73. It should be remembered that the registration line 73 is also equiangularly displaced between the arcuate slots 67 and 68. When the cover plate is locked in position by the locking ring 33, the "dead zone" is centered about the point when the cutting members are operative.

The length of the "dead zone" is adjusted during the operation of the system by rotation of the dead zone vernier knob 36. As discussed in conjunction with FIGURES 3 and 4, rotation of this knob causes rotation of the cam 58 with subsequent movement of the bracket 41. If the bracket 41 is moved to its central position with respect to the cover 32, light begins to pass through the arcuate slot 67 immediately as light ceases to pass through arcuate slot 74. As the cam is rotated to force the bracket 41 away from the center position, an increasing time delay occurs between the time light stops passing through the arcuate slot 68 and the time it begins to pass through the arcuate slot 67. This adjustment, which is a vernier adjustment as a result of the cam configuration, sets the tolerance within which the cutters 15 and 16 engage the web material with respect to the normal or predetermined point without correction of the web feed rate. The adjustment of the "dead zone" is dependent upon the registration mark width, so that the wider the registration mark and the limit of permissible tolerance, the farther from the center of the cover plate the bracket 41 is displaced. Further, it should be noted that movement of the bracket 41 varies the "dead zone" symmetrically with respect to the cutting position.

Another adjustment which can be performed with this selector switch during operation is that of changing the position of the cut relative to the registration mark 102. If the cutting position of the web material 10 needs to be changed, the cover locking ring 33 is released. Slowly rotating the cover plate 32 causes the selector switch to actuate one of the two "and" circuits to cause the correction motor 20 to either advance or retard the web feed until the cover plate rotation is stopped. In this manner, rotating the cover plate 32 slowly and incrementally displaces the cut a distance equal to the distance between the registration marks.

Summarizing, the selector switch has two energy-producing and energy-sensitive devices fixedly mounted with respect to a cover plate. A rotating disc having two slots therein rotates with the work performing means, such as rotary cutters or printing members, and between the energy-sensitive devices so that energy reaches one of the energy-sensitive devices once during each revolution of the disc to produce a signal. Two signals are thus produced by the selector switch during each revolution of the disc. The slots and the energy-sensitive devices are located so that a phase delay exists between the two signals and the center of this phase delay is representative of the time when the work performing means acts on the material. The selector switch which forms this invention is easily and symmetrically adjustable during operation of the system to vary the time when the work performing means acts on the material to set a tolerable range for such work to be done.

While the present invention has been described with reference to a particular embodiment thereof and a particular system, various modifications may be made by those skilled in the art without actually departing from the spirit and scope of the invention. Such anticipated modifications could include substitution of other devices to sense the position of the arcuate slots in the disc or other means to cause motion of the bracket carrying the energy-sensitive devices. Therefore, the appended claims are intended to cover all such equivalent variations which come within the true spirit and scope of the invention.

What I claim as new and desire to secure by Letters Patent of the United States is:

1. In a register control system for advancing material of indeterminate length to means to perform work on the material at a predetermined position with respect to the registration marks thereon, a switch responsive to the position of the work performing means comprising a movable member coupled to said work performing means, said movable member having a reference mark to indicate the point at which said work performing means engages said material, first and second switching means symmetrically spaced on said movable member about said reference mark, and first and secnod signal producing means positioned adjacent said movable member so that a first signal is produced when said first switching means permits signal passage from said first signal producing means and a second signal is produced when said second switching means permits signal passage from said second signal producing means during each complete movement of said movable member.

2. In a register control system for advancing material of indeterminate length to means to perform work on the material at a predetermined position with respect to registration marks thereon, a switch responsive to the work performing means position comprising housing means, first and second signal producing means mounted on said housing means, a rotatable disc mounted in said housing means for connection with the work performing means, first and second slots formed in said disc such that a first signal is produced when said first slot passes said first signal producing means and such that a second signal is produced when said second slot passes said second signal producing means, and a utilization circuit connected to said first and second signal producing means.

3. In a register control system for advancing material of indeterminate length to a means to perform work on the mateiral at a predetermined position with respect to registration marks thereon, a switch responsive to the work performing means position comprising a housing, a cover mounted in said housing, a rotatable disc mounted in said housing for connection with the work performing means, said disc having first and second slots formed therethrough adjacent the circumference of said disc, first sensing means to sense the passage of said first slot as said disc rotates, second sensing means to sense the passage of said second slot as said disc rotates, means securing said first and second sensing means to said cover member such that said sensing means can sense the passage of said slots, first signal producing means connected to said first sensing means to produce a first signal when said first slot passes said first sensing means, second signal producing means connected to said second sensing means to produce a second signal when said second slot passes said second sensing means, and a utilization circuit connected to said first and second signal producing means.

4. A switch as described in claim 3 having means on said rotatable disc to vary the size of said first or second slot.

5. In a register control system for advancing material of indeterminate length to means to perform work on the material at a predetermined position with respect to registration marks thereon, a switch responsive to the work performing means position comprising a housing, a cover member rotatably mounted on said housing, a bracket mounted on said cover for rotation therewith and for linear motion with respect to said cover, said bracket having first and second ends, a first energy-sensitive means and a first energy-transmitting means mounted on said bracket at said first end in spaced relation, a second energy-sensitive means and a second energy-transmitting means mounted on said bracket at said second end in spaced relation, a rotatable disc mounted in said housing for rotation with the work performing means, said disc having first and second slots formed therein, said disc disposed such that said first slot passes between said first energy-sensitive means and said first energy-transmitting means as said disc rotates and such that said second slot passes between said second energy-sensitive means and said second energy-transmitting means as said disc rotates, and a utilization circuit connected to said first and second energy-sensitive means to produce and to utiilze signals when said first and second slots pass said first and second energy-sensitive means.

6. A switch as described in claim 5 having means on said rotatable disc to vary the size of said first and second slots.

7. A switch as described in claim 6 wherein said disc has cutouts formed therein to facilitate mounting of said bracket and said cover and wherein said means to vary the size of said slots is adapted to cover said cutouts during operation of said switch.

8. A switch as described in claim 5 wherein said first and second slots are disposed at least 90 degrees apart.

9. A switch as described in claim 5 wherein said energy-sensitive means are constituted by photocells and wherein said energy-transmitting means comprise light sources.

10. A switch as described in claim 5 having means to impart linear motion to said bracket mounted in said cover.

11. A switch as described in claim 10 wherein said motion imparting means comprises a cam and spring assembly.

12. In a system for advancing material of indeterminate length having registration marks thereon including work performing means for performing work on said material and means to feed the material to the work performing means, a register control comprising means to sense the passage of a registration mark on the material and produce an output signal in response thereto, a switch responsive to the position of the work performing means comprising first and second signal producing means, disc means coupled and responsive to the position of said work performing means, said disc means including first and second shutter means, such that with the movement of said disc means in response to said work performing means a first signal is produced when said first shutter means is brought in alignment with said first signal producing means and a second signal is produced when said second shutter means is brought in alignment with said second signal producing means, and a utilization circuit connected to said switch and said sensing means and coupled to said material feeding means to cause variation in the position of the material with respect to the work performing means when signals from said switch and said sensing means are applied to said utilization circuit simultaneously.

13. In a register control system for advancing material of indeterminate length including a means to perform work on the material at a predetermined position with respect to registration marks thereon, a material feeder, a drive motor, means coupling the drive motor to the work performing means, a second motor, and means coupling the drive motor and the second motor to the material feeder, a register control including an energy-sensitive device to sense the passage of registration marks on the material and to produce an output signal in response thereto, a switch responsive to the work performing means position comprising a housing, a cover mounted on said housing, a rotatable disc mounted in said housing for connection with the work performing means, said disc having first and second slots formed therethrough, first sensing means to sense the passage of said first slot as said disc rotates, second sensing means to sense the passage of said second slot as said disc rotates, means securing said first and second sensing means to said cover member such that said sensing means can sense the passage of said slots, first signal producing means connected to said first sensing means to produce a first sensing signal when said first slot passes said first means, second signal producing means connected to said first sensing means to produce a second signal when said second slot passes said second sensing means, and a utilization circuit connected to said switch and to said energy-sensitive device and adapted to energize the second motor when said utilization circuit is energized simultaneously by signals from said energy-sensitive device and said switch.

14. In a system for advancing material of indeterminate length having registration marks thereon including work performing means for performing work on said material and means to feed the material to the work performing means, a register control comprising means to sense the passage of a registration mark on the material and produce an output signal in response thereto, a switch responsive to the position of the work performing means comprising a movable member coupled to said work performing means, said movable member having a reference mark to indicate the point at which said work performing means engages said material, first and second switching means symmetrically spaced on said movable member about said reference mark, first and second signal producing means positioned adjacent said movable member so that a first signal is produced when said first switching means permits signal passage from said first signal producing means and a second signal is produced when said second switching means permits signal passage from said second signal producing means during each complete movement of said movable member, and a utilization circuit connected to said switch and said sensing means and coupled to said material feeding means to cause variation in the position of the material with respect to the work performing means when signals from said switch and said sensing means are applied to said utilization circuit simultaneously.

References Cited

UNITED STATES PATENTS

| | | | |
|---|---|---|---|
| 2,250,209 | 7/1941 | Shoults et al. | 226—31 |
| 2,262,362 | 11/1941 | Gulliksen | 226—31 |
| 2,529,161 | 11/1950 | Kelling et al. | 226—31 X |
| 2,609,197 | 9/1952 | McKenney et al. | 226—31 |
| 2,945,429 | 7/1960 | Grant | 226—31 X |
| 2,977,035 | 3/1961 | Tilton et al. | 226—31 |

M. HENSON WOOD, Jr., *Primary Examiner.*

A. N. KNOWLES, *Assistant Examiner.*